United States Patent
Cui et al.

(10) Patent No.: US 11,288,090 B1
(45) Date of Patent: *Mar. 29, 2022

(54) METHODS, SYSTEMS, AND MEDIA FOR INJECTING CODE INTO EMBEDDED DEVICES

(71) Applicants: Ang Cui, New York, NY (US); Salvatore J. Stolfo, New York, NY (US)

(72) Inventors: Ang Cui, New York, NY (US); Salvatore J. Stolfo, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,557

(22) Filed: Aug. 20, 2018

Related U.S. Application Data

(63) Continuation of application No. 12/765,814, filed on Apr. 22, 2010, now Pat. No. 10,055,251.

(Continued)

(51) Int. Cl.
*G06F 9/46* (2006.01)
*G06F 21/52* (2013.01)
(Continued)

(52) U.S. Cl.
CPC ............ *G06F 9/461* (2013.01); *G06F 8/656* (2018.02); *G06F 9/48* (2013.01); *G06F 21/00* (2013.01);
(Continued)

(58) Field of Classification Search
CPC ...... G06F 8/67; G06F 21/00; G06F 21/50–52; G06F 21/64; G06F 21/554
See application file for complete search history.

(56) References Cited

U.S. PATENT DOCUMENTS 6,052,778 A 4/2000 Hagy et al.
6,253,317 B1 6/2001 Knapp, III et al.
(Continued)

FOREIGN PATENT DOCUMENTS

WO WO 2013176711 11/2013

OTHER PUBLICATIONS

"Binwalk", last updated Jul. 25, 2014, pp. 1-2, available at: https://github.com/devttys0/binwalk/wiki.
(Continued)

*Primary Examiner* — John M. Lindlof
(74) *Attorney, Agent, or Firm* — Byrne Poh LLP

(57) ABSTRACT

Methods, systems, and media for injecting code into embedded devices are provided. In accordance with some embodiments, methods for injecting code into embedded devices are provided, the methods comprising: embedding payload execution code into an embedded device; identifying program instructions in code of the embedded device into which jump instructions can be placed; inserting at least one jump instruction at an identified program instruction; allocating memory for storing an execution context of an injected payload; saving a context of the code of the embedded device to memory; loading and executing a payload context into a processor of the embedded device; determining when execution of the payload context is to be interrupted; and in response to determining that the execution of the payload context is to be interrupted, saving the payload context, restoring the context of the code of the embedded device, and continuing execution of the code of the embedded device.

17 Claims, 6 Drawing Sheets

Related U.S. Application Data

(60) Provisional application No. 61/171,643, filed on Apr. 22, 2009.

(51) Int. Cl.

| | | |
|---|---|---|
| *G06F 21/57* | (2013.01) | |
| *G06F 8/656* | (2018.01) | |
| *G06F 9/48* | (2006.01) | |
| *G06F 21/50* | (2013.01) | |
| *G06F 21/51* | (2013.01) | |
| *G06F 21/64* | (2013.01) | |
| *G06F 21/00* | (2013.01) | |
| *G06F 9/445* | (2018.01) | |

(52) U.S. Cl.
CPC ............. *G06F 21/50* (2013.01); *G06F 21/51* (2013.01); *G06F 21/52* (2013.01); *G06F 21/577* (2013.01); *G06F 21/64* (2013.01); *G06F 9/44521* (2013.01)

(56) References Cited

U.S. PATENT DOCUMENTS

| | | |
|---|---|---|
| 6,874,087 B1 | 3/2005 | Fetkovich et al. |
| 6,996,814 B2 | 2/2006 | Bak |
| 7,386,839 B1 | 1/2008 | Golender et al. |
| 7,596,721 B1 | 9/2009 | Flake et al. |
| 8,001,596 B2 | 8/2011 | Wollnik et al. |
| 8,239,836 B1 | 8/2012 | Franz et al. |
| 8,266,597 B2 | 9/2012 | Panchamukhi et al. |
| 8,510,596 B1 | 8/2013 | Gupta et al. |
| 8,700,851 B2 | 4/2014 | Togawa |
| 10,055,251 B1 | 8/2018 | Cui et al. |
| 2001/0037494 A1 | 11/2001 | Levien et al. |
| 2002/0013938 A1 | 1/2002 | Duesterwald et al. |
| 2002/0166059 A1 | 11/2002 | Rickey et al. |
| 2002/0199172 A1 | 12/2002 | Bunnell |
| 2003/0023856 A1 | 1/2003 | Horne et al. |
| 2003/0056115 A1 | 3/2003 | Falkenberg |
| 2003/0115580 A1 | 6/2003 | Arai et al. |
| 2003/0163508 A1 | 8/2003 | Goodman |
| 2003/0204374 A1 | 10/2003 | Madsen et al. |
| 2004/0143828 A1 | 7/2004 | Liu et al. |
| 2004/0168157 A1 | 8/2004 | Hundt et al. |
| 2004/0237068 A1 | 11/2004 | Ren |
| 2005/0060522 A1 | 3/2005 | Correa |
| 2005/0063242 A1 | 3/2005 | Ren |
| 2005/0108562 A1 | 5/2005 | Khazan et al. |
| 2006/0107268 A1 | 5/2006 | Chrabieh |
| 2006/0161985 A1 | 7/2006 | Zhao |
| 2006/0174226 A1 | 8/2006 | Fair et al. |
| 2006/0277539 A1 | 12/2006 | Amarasinghe et al. |
| 2006/0294593 A1 | 12/2006 | Eldar et al. |
| 2007/0022428 A1 | 1/2007 | Yamasaki |
| 2007/0055711 A1 | 3/2007 | Polyakov et al. |
| 2007/0226717 A1 | 9/2007 | Shtilman et al. |
| 2007/0240217 A1 | 10/2007 | Tuvell et al. |
| 2007/0274230 A1 | 11/2007 | Werber et al. |
| 2008/0083030 A1 | 4/2008 | Durham et al. |
| 2008/0291017 A1 | 11/2008 | Yermal et al. |
| 2009/0055609 A1 | 2/2009 | Kuczynski et al. |
| 2009/0249368 A1 | 10/2009 | Needamangala et al. |
| 2010/0011243 A1 | 1/2010 | Locasto et al. |
| 2010/0275173 A1 | 10/2010 | McDonald et al. |
| 2010/0306319 A1 | 12/2010 | Brzozowski |
| 2010/0325704 A1 | 12/2010 | Etchegoyen et al. |
| 2011/0088095 A1 | 4/2011 | Stewart et al. |
| 2011/0219452 A1 | 9/2011 | Porter et al. |
| 2011/0276837 A1 | 11/2011 | Potter et al. |
| 2012/0011219 A1 | 1/2012 | Zhang et al. |
| 2012/0017262 A1 | 1/2012 | Kapoor et al. |
| 2012/0079287 A1 | 3/2012 | Leclercq et al. |
| 2012/0331280 A1 | 12/2012 | Lin et al. |
| 2013/0007466 A1 | 1/2013 | Sarangdhar et al. |
| 2013/0191624 A1 | 7/2013 | Jarmay |
| 2014/0351569 A1 | 11/2014 | Durand |
| 2016/0021121 A1 | 1/2016 | Cui et al. |

OTHER PUBLICATIONS

"Buffer Overflow 6: The Function Stack", last accessed: Oct. 4, 2016, pp. 1-12, available at: http://www.tenouk.com/Bufferoverflowc/Bufferoverflow2a.html.

A. Cui, "FRAK: Firmware Reverse Analysis Konsole", In Proceedings of Black Hat USA, Jul. 21-26, 2012, Las Vegas, NV, US, pp. 1-33.

Abma, J., "Virata EmWeb R6.0.1 Remote Crash Vulnerability", Technical Report, Jun. 4, 2010, pp. 1, available at: http://www.exploit-db.com/exploits/12095/.

APCMAG.com, "New Worm can Infect Home Modem/Routers", last updated 2009, pp. 1-8, available at: http://apcmag.com/Content.aspx?id=3687.

Arce, I., "The Rise of the Gadgets", In IEEE Security and Privacy, vol. 1, No. 5, Sep.-Oct. 2003, pp. 78-81.

Aviv, A.J. et al., "Security Evaluation of ES&S Voting Machines and Election Management System", In Proceedings of the Usenix/Accurate Electronic Voting Workshop, Jul. 28-29, 2008, pp. 1-13.

Bellissimo, A. et al., "Secure Software Updates: Disappointments and New Challenges", In Proceedings of the 1st Usenix Hot Topics in Security (HotSec), Vancouver, BC, CA, Jul. 31-Aug. 4, 2006, pp. 1-7.

CERT, "CERT Advisory CA-2002-07: Double Free Bug in zlib Compression Library", Technical Report, Mar. 12, 2002, pp. 1-7, available at: http://www.cert.org/advisories/CA-2002-07.html.

Chang, H. and Atallah, M.J., "Protecting Software Code by Guards", In Proceedings of the Digital Rights Management Workshop, Philadelphia, PA, US, Nov. 5, 2001, pp. 160-175.

Chen, K., "Reversing and Exploiting an Apple Firmware Update", In Proceedings of Black Hat USA, Las Vegas, NV, US, Jul. 25-30, 2009, pp. 1-190.

Costin, A., "Hacking MFPs: Part 2—Postscript: Um, You've Been Hacked", In Proceedings of the 28th Chaos Communication Congress, Dec. 27, 2011, pp. 1-44.

Cui, A. and Stolfo, S.J., "A Quantitative Analysis of the Insecurity of Embedded Network Devices: Results of a Wide-Area Scan", In Proceedings of the 26th Annual Computer Security Applications Conference (ACSAC '10), Austin, TX, US, Dec. 6-10, 2010, pp. 97-106.

Cui, A. and Stolfo, S.J., "Defending Embedded Systems with Software Symbiotes", In Proceedings of Recent Advances in Intrusion Detection (RAID), 14th International Symposium, Menlo Park, CA, US, Sep. 20-21, 2011, pp. 358-377.

Cui, A. and Stolfo, S.J., "Software Symbiotes, Self-Monitoring-Monitors and Autotomic Binary Structure Randomization", Feb. 21, 2012, pp. 1-8.

Cui, A. and Stolfo, S.J., "Symbiotes and Defensive Mutualism: Moving Target Defense", In Advances in Information Security: Moving Target Defense, vol. 54, Aug. 26, 2011, pp. 99-108.

Cui, A. et al., "Brave New World: Pervasive Insecurity of Embedded Network Devices", In Proceedings of the 14th International Symposium on Recent Advances in Intrusion Detection (RAID '09), Saint-Malo, FR, Sep. 23-25, 2009, pp. 378-380.

Cui, A. et al., "From Prey to Hunter: Transforming Legacy Embedded Devices into Exploitation Sensor Grids", In Proceedings of the 27th Annual Computer Security Applications Conference (ACSAC '11), Orlando, FL, US, Dec. 5-9, 2011, pp. 393-402.

Cui, A. et al., "Killing the Myth of Cisco IOS Diversity: Towards Reliable, Large-scale Exploitation of Cisco IOS", In Proceedings of Blackhat Briefings USA, Aug. 3, 2011, pp. 1-57.

Cui, A. et al., "When Firmware Modifications Attack: A Case Study of Embedded Exploitation", In Proceedings of the 20th Annual Network and Distributed System Secuirty Symposium (NDSS '13), San Diego, CA, US, Feb. 24-27, 2013, pp. 1-13.

Cui, A. et al., "Killing the Myth of Cisco IOS Diversity: Recent Advances in Reliable Shellcode Design", In Proceedings of the 5th Usenix Conference on Offensive Technologies, Aug. 8-12, 2011, San Francisco, CA, USA, pp. 3.

(56) References Cited

OTHER PUBLICATIONS

Dronebl.org, "Network Bluepill—Stealth Router-Based Botnet has been DDoSing Dronebl for the Last Couple of Weeks", last updated Mar. 22, 2009, pp. 1-13, available at: http://www.dronebl.org/blog/8.
Erlingsson, U. et al., "Xfi: Software Guards for System Address Spaces", In Proceedings of the 7th Symposium on Operating Systems Design and Implementation, Seattle, WA, US, Nov. 6-8, 2006, pp. 75-88.
FX of Phenoelit, "Attacking Networked Embedded Systems", In Black Hat Windows Security, Feb. 24-27, 2003, Seattle, WA, US, pp. 1-56.
Halperin, D. et al., "Pacemakers and Implantable Cardiac Defibrillators: Software Radio Attacks and Zero-Power Defenses", In Proceedings of the 29th Annual IEEE Symposium on Security and Privacy, Oakland, CA, USA, May 18-21, 2008, pp. 129-142.
Hanna, S. et al., "Take Two Software Updates and See Me in the Morning: The Case for Software Security Evaluations of Medical Devices", In Proceedings of the 2nd Usenix Conference on Health Security and Privacy, Aug. 9, 2011, pp. 6-10.
Hewlett-Packard, "HP Web JetAdmin: Solution Brief", May 2014, pp. 1-4, available at: http://h20195.www2.hp.com/V2/GetPDF.aspx/4AA5-2718ENW.pdf.
Hewlett-Packard, "SSRT100692 rev.2—Certain HP Printers and HP Digital Senders, Remote Firmware Update Enabled by Default", Dec. 27, 2011, pp. 1-8, available at: http://seclists.org/bugtraq/2011/Dec/175.
HP Support Communication-Security Bulletin, "HPSBPI02728 SSRT100692 rev.6—Certain HP Printers and HP Digital Senders, Remote Firmware Update Enabled by Default", Technical Report, Nov. 30, 2011, pp. 1-6, available at: http://h20000.www2.hp.com/bizsupport/TechSupport/Document.jsp?objectID=c03102449.
HP, "Hewlett-Packard LaserJet 4200/4300 Series Printers—Firmware Update/Download Release/Installation Notes", last accessed Oct. 9, 2014, pp. 1-10, available at: http://ftp.hp.com/pub/printers/software/lj4200lbreadmefw.txt.
Hunt, G. and Brubacher, D., "Detours: Binary Interception of Win32 Functions", In Proceedings of the 3rd Usenix Windows NT Symposium (Winsym '99), Seattle, WA, US, Jul. 12-13, 1999, pp. 135-144.
Kaiten.c, "IRC DDOS Bot", last accessed Jun. 10, 2010, pp. 1-17, available at: http://packetstormsecurity.nl/irc/kaiten.c.
Krügel, C. et al., "Detecting Kernel-Level Rootkits Through Binary Analysis", In Proceedings of the 20th Annual Computer Security Applications Conference (ACSAC '04), Tucson, AZ, US, Dec. 6-10, 2004, pp. 91-100.
Li, Y. et al., "Sbap: Software-Based Attestation for Peripherals", In Proceedings of the 3rd International Conference on Trust and Trustworthy Computing (Trust '10), Berlin, DE, Jun. 21-23, 2010, pp. 16-29.
Li, Y. et al., "VIPER: Verifying the Integrity of PERipherals' Firmware", In Proceedings of the 18th ACM Conference on Computer and Communications Security, Chicago, IL, US, Oct. 17-21, 2011, pp. 3-16.
Ligati, J. et al., "Enforcing Security Policies with Run-time Program Monitors", Technical Report, Princeton University, Feb. 2005, pp. 1-74.
Linder, F., "Cisco IOS Router Exploitation," In Proceedings of Blackhat USA, Las Vegas, NV, US, Jul. 25-30, 2009, pp. 1-10.
Linder, F., "Cisco Vulnerabilities", In Proceedings of Black Hat Federal, Tyson's Corner, VA, US, Oct. 1-2, 2003, pp. 1-48.
Lippmann, R. et al. (Eds.), "Recent Advances in Intrusion Detection: Proceedings of the 11th International Symposium on Recent Advances in Intrusion Detection, (RAID '08)", Cambridge, MA, USA, Sep. 15-17, 2008, vol. 5230 of Lecture Notes in Computer Science, Springer, 2008, pp. 1-424.
McLaughlin, S. et al., "Embedded Firmware Diversity for Smart Electric Meters", In Proceedings of the 5th Usenix Workshop on Hot Topics in Secuity, Washington, D.C., US, Aug. 20, 2010, pp. 1-6.

Merriam-Webster Online Dictornary, "Regard", Merriam-Webster, May 14, 2006, pp. 1-2.
Microsoft Corporation, "Kernel Patch Protection: Frequently Asked Questions", Jan. 22, 2007, pp. 1-3, available at: http://msdn.microsoft.com/en-us/library/windows/hardware/Dn613955(v=vs.85).aspx.
Miller, C., "Battery Firmware Hacking", In Proceedings of Black Hat USA, Jul. 12, 2011, Las Vegas, NV, US, pp. 1-38.
Muniz, S., "Killing the Myth of Cisco IOS Rootkits: DIK", In Proceedings of EUSecWest, May 2008, pp. 1-37.
National Vulnerability Database, "Vulnerability Summary for CVE-2011-4785", Technical Report, Jan. 18, 2012, pp. 1-3, available at: http://web.nvd.nist.gov/view/vuln/detail?vulnId=CVE-2011-4785.
Newman, T. et al., "SCADA and PLC Vulnerabilities in Correctional Facilities", White Paper, Jul. 30, 2011, pp. 1-14.
O'Sullivan, P. et al., "Retrofitting Security in COTS Software with Binary Rewiring", In Future Challenges in Security and Privacy for Academia and Industry, Jan. 2011, pp. 154-172.
Prabhu, P. et al., "Smashing the Stack with Hydra: The Many Heads of Advanced Shellcode Polymorphism", In Proceedings of Defcon 17, Las Vegas, NV, US, Jul. 30-Aug. 2, 2009, pp. 1-20.
Prevelakis, V. and Spinellis, D., "The Athens Affair", In IEEE Spectrum, vol. 44, No. 7, Jul. 2007, pp. 26-33.
Riley, R. et al., "Guest-Transparent Prevention of Kernel Rootkits with VMM-Based Memory Shadowing", In Proceedings of the 11th International Symposium on Recent Advances in Intrusion Detection (RAID '08), Cambridge, MA, US, Sep. 15-17, 2008, pp. 1-20.
Rinard, M., "Manipulating Program Functionality to Eliminate Security Vulnerabilities", In Advances in Information Security, vol. 54, Aug. 5, 2011, pp. 109-115.
Roecher, D.J., and Thumann, M., "NAC Attack: Hacking the Cisco NAC Framework", In Proceedings of BlackHat USA, Mar. 9, 2007, pp. 1-29.
Seshadri, A. et al., "SWATT: SoftWare-Based ATTestation for Embedded Devices", In Proceedings of the IEEE Symposium on Security and Privacy (S&P '04), Oakland, CA, US, May 9-12, 2004, pp. 272-282.
Skywing, "Subverting PatchGuard Version 2", In Uninformed, vol. 6, Dec. 2006, pp. 1-60.
Spansion, "S25FL064P: 64 Mbit CMOS 3.0 Volt Flash Memory with 104-MHz SPI (Serial Peripheral Interface) Multi I/O Bus", Technical Report, Nov. 18, 2011, pp. 1-67, available at: http://www.spansion.com/Support/Datasheets/S25FL064P_00.pdf.
Stolfo, S.J. et al., "Self-Monitoring Monitors", Technical Report, CUCS-026-09, Columbia University Computer Science Department, Apr. 27, 2009, pp. 1-11.
Sutton, M., "Corporate Espionage for Dummies: The Hidden Threat of Embedded Web Servers", In Proceedings of Black Hat USA, Las Vegas, NV, US, Aug. 3-4, 2011, pp. 1-98.
U.S. CERT—Vulnerability Note VU#238678, "The zlib Compression Library is Vulnerable to a Denial-of-Service Condition", Technical Report, Oct. 1, 2004, pp. 1-3, available at: http://www.kb.cert.org/vuls/id/238678.
U.S. CERT—Vulnerability Note VU#680620, "Zlib Inflate( ) Routine Vulnerable to Buffer Overflow", Jul. 12, 2005, pp. 1-3, available at: http://www.kb.cert.org/vuls/id/680620.
Vasisht, V.R. and Lee, H.H.S., "Shark: Architectural Support for Autonomic Protection Against Stealth by Rootkit Exploits", In Proceedings of the 41st IEEE International Symposium on Microarchitecture, Como, Italy, Nov. 8-12, 2008, pp. 106-116.
VxWorks, "socklib", last accessed Apr. 30, 2012, pp. 1-19, available at: http://www-kryo.desy.de/documents/vxWorks/V5.5/vxworks/ref/sockLib.html.
Wang, K. and Stolfo, S.J., "Anomalous Payload-Based Network Intrusion Detection", In Proceedings of the 7th International Symposium on Recent Advances in Intrusion Detection (RAID '04), Sophia Antipolis, FR, Sep. 15-17, 2004, pp. 203-222.
Wang, Z. et al., "Countering Persistent Kernel Rootkits Through Systematic Hook Discovery", In Proceedings of the 11th International Symposium on Recent Advances in Intrusion Detection (RAID '08), Cambridge, MA, US, Sep. 15-17, 2008, pp. 21-38.

(56) References Cited

OTHER PUBLICATIONS

Ghourabi et al., "Honeypot Router for Routing Protocols Protection", In Proceedings of the 4th International Conference on Risks and Security of Internet and Systems (CRiSIS '09), Toulouse, FR, Oct. 19-22, 2009, pp. 127-130.
Hewlett-Packard, "HP Security Solutions FAQ", Technical Report, May 2006, pp. 1-10.
Matwyshyn et al., "Ethics in Security Vulnerability Research," in IEEE Security and Privacy 8.2, Mar. 2010, pp. 68-73.
Dynamorio, "DynamoRio System Details", Technical Report, last accessed Sep. 10, 2014, available at: http://dynamorio.org/, pp. 1-3.
Extended European Search Report dated May 20, 2016 in European Patent Application No. 13793379.2, pp. 1-8.
FX of Phenoelit, "Attacking networked embedded systems", In Proceedings of Black Hat Windows Security, Seattle, WA, US, Feb. 24-27, 2003, pp. 1-56.
International Preliminary Report on Patentability and Written Opinion dated May 21, 2015 in International Patent Application No. PCT/US2013/026529, pp. 1-8.
International Search Report and Written Opinion dated Dec. 2, 2013 in International Patent Application No. PCT/US2013/026529, pp. 1-10.
Meier, S., "The End of your Internet: Malware for Home Routers", Nice Name Crew, Aug. 4, 2008, available at: http://data.nicenamecrew.com/papers/malwareforrouters/paper.txt, pp. 1-6.
National Vulnerability Database, "Vulnerability Summary for CVE-2008-4419", Technical Report, last accessed Mar. 8, 2011, available at: http://web.nvd.nist.gov/view/vuln/detail?vulnId=CVE-2008-4419, pp. 1-3.
National Vulnerability Database, "Vulnerability Summary for CVE-2011-4161", Technical Report, last accessed Feb. 2, 2012, available at: http://web.nvd.nist.gov/view/vuln/detail?vulnId=CVE-2011-4161, pp. 1-4.
Notice of Allowance dated Jan. 22, 2016 in U.S. Appl. No. 14/379,166, pp. 1-43.
Notice of Allowance dated Apr. 6, 2020 in Korean Patent Application No. 10-2014-7025726, pp. 1-7.
Notice of Allowance dated Apr. 18, 2018 in U.S. Appl. No. 12/765,814, 1-17.
Notice of Allowance dated Oct. 12, 2018 in U.S. Appl. No. 15/136,581, pp. 1-30.
Office Action dated Jan. 28, 2015 in U.S. Appl. No. 12/765,814, pp. 2-15.
Office Action dated Mar. 7, 2017 in U.S. Appl. No. 15/136,581, pp. 2-15.
Office Action dated Apr. 23, 2014 in U.S. Appl. No. 12/765,814, pp. 2-12.
Office Action dated Jul. 29, 2016 in U.S. Appl. No. 12/765,814, pp. 2-9.
Office Action dated Aug. 19, 2019 in KR Patent Application No. 10-2014-7025726, pp. 1-10.
Office Action dated Aug. 22, 2013 in U.S. Appl. No. 12/765,814, pp. 2-10.
Office Action dated Sep. 28, 2015 in U.S. Appl. No. 12/765,814, pp. 2-9.
Office Action dated Oct. 3, 2017 in U.S. Appl. No. 12/765,814, pp. 2-5.
Office Action dated Oct. 11, 2012 in U.S. Appl. No. 12/765,814, pp. 2-26.
Office Action dated Nov. 8, 2017 in U.S. Appl. No. 15/136,581, pp. 2-19.
U.S. Appl. No. 61/171,643, Cui et al., filed Apr. 22, 2009, pp. 1-11.
U.S. Appl. No. 61/599,377, Cui et al., filed Feb. 15, 2012, pp. 1-37.
U.S. Appl. No. 61/602,061, Cui et al., filed Feb. 22, 2012, pp. 1-45.
U.S. Appl. No. 61/765,646, Cui et al., filed Feb. 15, 2013, pp. 1-58.
Notice of Allowance dated Aug. 31, 2020 in U.S. Appl. No. 16/458,748, pp. 2-10.
Hewlett-Packard, "SSRT100692 rev.1 —Certain HP Printers and HP Digital Senders, Remote Firmware Update Enabled by Default", Nov. 30, 2011, pp. 1-3, available at: http://seclists.org/bugtraq/2011/Dec/3.
Hewlett-Packard, "SSRT100692 rev.3—Certain HP Printers and HP Digital Senders, Remote Firmware Update Enabled by Default", Jan. 9, 2012, pp. 1-5, available at: http://seclists.org/bugtraq/2012/Jan. 49.
International Data Corporation, "Worldwide Hardcopy Peripherals Market Recorded Double-Digit Year-Over-Year Growth in the Second Quarter of 2010, According to IDC", Sep. 1, 2010, pp. 1-3, available at: http://www.businesswire.com/news/home/20100901005256/en/.
Jack, B., "Jackpotting Automated Teller Machines Redux", In Proceedings of Black Hat USA, Las Vegas, NV, US, Jul. 28-29, 2010, pp. 1-5, video available at: https://www.youtube.com/watch?v=FkteGFfvwJ0.
Pt, "Oops, I Hacked My PBX: Why Auditing Proprietary Protocols Matters", In Proceedings of 28th Chaos Communication Congress, Berlin, DE, Dec. 29, 2011, pp. 1-63.
Securityfocus, "Sec. Vulnerability in ChaiVM EZloader", last accessed Jul. 30, 2002, pp. 1-3, available at: http://www.securityfocus.com/advisories/4317.

```
void dummyPEMPayload( register unsigned int * saveLocation,
                     register unsigned int * checkMemStart,
                     register unsigned int * checkMemStop,
                     register unsigned int * statusRegister)
{
    unsigned int * x;

while (1) { for(x=(checkMemStart); x < checkMemStop; x+=1) {
            \\ do something useful (calculate checksum)

if ((int) x % 0x7FF == 0) {
                asm("jalr $t9");
            }
            *(statusRegister) = (unsigned int) *(x);
        }
    }
}
```

```
Void dummyPEMPayload(PEM args)
{

While(True) { scan through memory segment perform computation on memory
        segment periodically yield control of CPU to
        native OS

}
}
```

FIG. 6

METHODS, SYSTEMS, AND MEDIA FOR INJECTING CODE INTO EMBEDDED DEVICES

CROSS REFERENCE TO RELATED APPLICATIONS

This application is a continuation of U.S. patent application Ser. No. 12/765,814, filed Apr. 22, 2010, which claims the benefit of U.S. Provisional Patent Application No. 61/171,643, filed Apr. 22, 2009, each of which is hereby incorporated by reference herein in its entirety.

STATEMENT REGARDING FEDERALLY SPONSORED RESEARCH OR DEVELOPMENT

This invention was made with government support under Grant No. N00014-09-1-0757 awarded by Office of Naval Research (ONR). The government has certain rights in the invention.

TECHNICAL FIELD

The disclosed subject matter relates to methods, systems, and media for inserting code into embedded devices.

BACKGROUND

Attackers routinely exploit vulnerabilities in computer systems to inject malicious code. For example, attackers can gain access to an internal network with the use of spyware or rootkits. Such software can be easily installed on computer systems from physical or digital media (e.g., email, downloads, etc.) and can provide these attackers with administrator or "root" access on a machine along with the capability of gathering sensitive data. In particular, attackers can snoop or eavesdrop on a computer or a network, download and exfiltrate data, steal assets and information, destroy critical assets and information, and/or modify information. Rootkits have the ability to conceal themselves and elude detection, especially when the rootkit is previously unknown, as is the case with zero-day attacks.

These attackers also have the capability to attack networked embedded devices, such as routers, access points, modems, network webcams, network printers, conferencing units, voice over IP (VOIP) adapters, and virtual private network (VPN) devices. A network of computers that has been infected with malicious code, where each infected computer can be controlled by an attacker often without knowledge of the infected computer's owner is generally referred to as a botnet and these networked embedded devices can be used in botnets. For example, networked embedded devices can be compromised using out-of-the-box default passwords and used in botnets, where, in many instances, embedded devices are the core communication components of a networked system.

In response to these threats, many computers are protected by antivirus software and firewalls. However, these preventative measures are not always adequate. In particular, traditional antivirus software does not work on embedded devices and, generally speaking, these embedded devices are not built with security in mind. Moreover, the code or firmware on these embedded devices is often proprietary and undisclosed to third parties. Accordingly, updating and modifying device firmware for different embedded devices is a difficult task.

There is therefore a need in the art for approaches for injecting code into embedded devices. Accordingly, it is desirable to provide methods, systems, and media that overcome these and other deficiencies of the prior art. For example, methods, systems, and media are provided that protect embedded devices against exploitation by injecting and modifying the code of the embedded device without altering the behavior of the embedded device and without prior knowledge of function entry points or other memory information in the embedded device.

SUMMARY

In accordance with various embodiments, mechanisms for injecting code into embedded devices are provided.

In some embodiments, mechanisms are provided for injecting code written in high level programming languages into embedded devices, such as routers, access points, modems, webcams, printers, conferencing units, VOIP adapters, VPN devices, and/or any other suitable device. Once the code is injected into the embedded device, the injected code analyzes and modifies the code of the embedded device (e.g., firmware) to create the execution environment for the injected code. For example, the injected code determines and selects function entry points, return instructions, program instruction locations, and/or other locations in the code and reallocates the needed system resources (e.g., processing and/or memory resources) such that the injected code can execute in a time-shared fashion concurrently with the code of the embedded device. That is, the code of the embedded device can be modified to allow repeated execution of the injected code without otherwise altering the behavior of the embedded device.

It should be noted that these mechanisms modify the code of the embedded device without reliance upon the source code. For example, the code of the embedded device is injected and modified without prior knowledge of function entry points or other memory information in the embedded device. It should also be noted that these mechanisms modify the code of the embedded device without altering the behavior of the embedded device.

These mechanisms can be used in a variety of applications. For example, these mechanisms provide the opportunity to upgrade and enhance deployed or existing devices (each having different firmware) with security features to protect those devices from attacks designed for nefarious purposes. In another example, these mechanisms can be used to retrofit a variety of embedded devices with detection and/or security applications (e.g., antivirus applications, intrusion detection systems, etc.). In a more particular example, a rootkit detector can be injected into a router, where the detector continuously verifies the integrity of the running code of the router. Using a code whitelisting strategy, the detector injected into the router can detect rootkit hooks and foreign code injection in real time.

Methods, systems, and media for injecting code into embedded devices are provided. In some embodiments, methods for injecting code into embedded devices are provided, the methods comprising: embedding payload execution code into an embedded device; identifying program instructions in code of the embedded device into which jump instructions can be placed; inserting at least one jump instruction at an identified program instruction; allocating memory for storing an execution context of an injected payload; saving a context of the code of the embedded device to memory; loading and executing a payload context into a processor of the embedded device; determining when execution of the payload context is to be interrupted; and in response to determining that the execution of the payload context is to be interrupted, saving the payload context, restoring the context of the code of the embedded device, and continuing execution of the code of the embedded device.

In some embodiments, a system for injecting code into embedded devices is provided, the system comprising: a processor that: embeds payload execution code into an embedded device; identifies program instructions in code of the embedded device into which jump instructions can be placed; inserts at least one jump instruction at an identified program instruction; allocates memory for storing an execution context of an injected payload; saves a context of the code of the embedded device to memory; loads and executes a payload context into a processor of the embedded device; determines when execution of the payload context is to be interrupted; and in response to determining that the execution of the payload context is to be interrupted, saves the payload context, restores the context of the code of the embedded device, and continues execution of the code of the embedded device.

In some embodiments, non-transitory computer-readable medium containing computer-executable instructions that, when executed by a processor, cause the processor to perform a method for injecting code into embedded devices, is provided. The method comprises: embedding payload execution code into an embedded device; identifying program instructions in code of the embedded device into which jump instructions can be placed; inserting at least one jump instruction at an identified program instruction; allocating memory for storing an execution context of an injected payload; saving a context of the code of the embedded device to memory; loading and executing a payload context into a processor of the embedded device; determining when execution of the payload context is to be interrupted; and in response to determining that the execution of the payload context is to be interrupted, saving the payload context, restoring the context of the code of the embedded device, and continuing execution of the code of the embedded device.

BRIEF DESCRIPTION OF THE DRAWINGS

FIG. 6 is a diagram showing an illustrative example of the payload execution code in accordance with some embodiments of the disclosed subject matter.

DETAILED DESCRIPTION

In accordance with various embodiments, mechanisms for injecting code into embedded devices are provided.

In some embodiments, mechanisms are provided for injecting code written in high level programming languages into embedded devices, such as routers, access points, modems, webcams, printers, conferencing units, VOIP adapters, VPN devices, and/or any other suitable device. Once the code is injected into the embedded device, the injected code analyzes and modifies the code of the embedded device (e.g., firmware) to create the execution environment for the injected code. For example, the injected code determines and selects function entry points, return instructions, program instruction locations, and/or other locations in the code and reallocates the needed system resources (e.g., processing and/or memory resources) such that the injected code can execute in a time-shared fashion concurrently with the code of the embedded device. That is, the code of the embedded device can be modified to allow repeated execution of the injected code without otherwise altering the behavior of the embedded device.

It should be noted that these mechanisms modify the code of the embedded device without reliance upon the source code. For example, the code of the embedded device is injected and modified without prior knowledge of function entry points or other memory information in the embedded device. It should also be noted that these mechanisms modify the code of the embedded device without altering the behavior of the embedded device.

These mechanisms can be used in a variety of applications. For example, these mechanisms provide the opportunity to upgrade and enhance deployed or existing devices (each having different firmware) with security features to protect those devices from attacks designed for nefarious purposes. In another example, these mechanisms can be used to retrofit a variety of embedded devices with detection and/or security applications (e.g., antivirus applications, intrusion detection systems, etc.). In a more particular example, a rootkit detector can be injected into a router, where the detector continuously verifies the integrity of the running code of the router. Using a code whitelisting strategy, the detector injected into the router can detect rootkit hooks and foreign code injection in real time.

Figure 1:
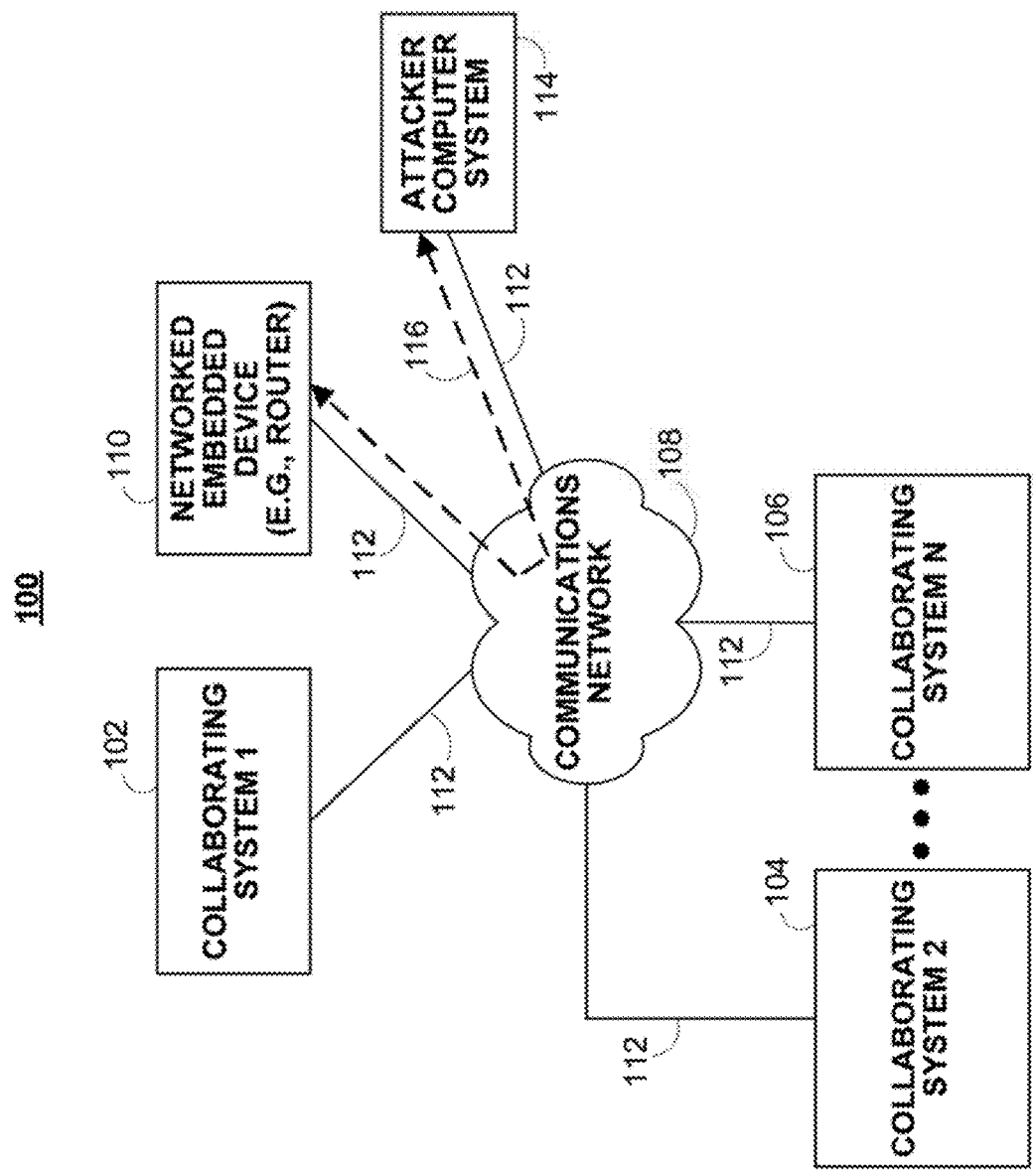
FIG. 1 is a diagram of a system suitable for implementing an application that injects codes into embedded devices in accordance with some embodiments of the disclosed subject matter.

Turning to FIG. 1, an example of a system 100 in which the payload injection mechanisms can be implemented. As illustrated, system 100 includes multiple collaborating computer systems 102, 104, and 106, a communication network 108, a networked embedded device 110, communication links 112, and an attacker computer system 114.

Collaborating systems 102, 104, and 106 can be systems owned, operated, and/or used by universities, businesses, governments, non-profit organizations, families, individuals, and/or any other suitable person and/or entity. Collaborating systems 102, 104, and 106 can include any number of user computers, servers, firewalls, routers, switches, gateways, wireless networks, wired networks, intrusion detection systems, and any other suitable devices. For example, collaborating systems 102, 104, and/or 106 can be connected to a networked embedded device 110. As used herein, embedded device 110 can be any number of routers, switches, gateways, webcams, gaming systems, input devices, imaging devices, conferencing units, communications devices, VPN devices, VOIP adapters, printers, and/or any other suitable devices. In a more particular example, embedded device 110 can be a Microprocessor without Interlocked Pipeline Stages (MIPS)-based embedded device or a PowerPC-based embedded device, such as a Cisco Systems router or a Linksys router.

It should be noted that any number of embedded devices 110 can be present in system 100, but only one is shown in FIG. 1 to avoid overcomplicating the drawing.

It should also be noted that each embedded device 110 can include code, such as firmware, that runs on the embedded device 110. For example, a router contains programs and/or data structures that control the operation and behavior of the router. In some embodiments, the code on the embedded device 110 is proprietary such that function entry points, memory locations, etc. in the embedded device 110 are unknown. It should further be noted that the code on one embedded device can be different from the code on another embedded device based on, for example, manufacturer of the embedded device, type of embedded device, etc.

In addition, collaborating systems 102, 104, and 106 can include one or more processors, such as a general-purpose computer, a special-purpose computer, a digital processing device, a server, a workstation, and/or various other suitable devices. Collaborating systems 102, 104, and 106 can run programs, such as operating systems (OS), software applications, a library of functions and/or procedures, background daemon processes, and/or various other suitable programs. In some embodiments, collaborating systems 102, 104, and 106 can support one or more virtual machines. Any number (including only one) of collaborating systems 102, 104, and 106 can be present in system 100, and collaborating systems 102, 104, and 106 can be identical or different.

Communication network 108 can be any suitable network for facilitating communication among computers, servers, etc. For example, communication network 108 can include private computer networks, public computer networks (such as the Internet), telephone communication systems, cable television systems, satellite communication systems, wireless communication systems, any other suitable networks or systems, and/or any combination of such networks and/or systems.

It should be noted that, in some embodiments, an attacker using attacker computer system 114 can obtain internal network access. For example, using spyware or rootkits, attackers can gain access to communications network 108. Such software can easily be installed on computer systems from physical or digital media (e.g., email, downloads, etc.) that provides an attacker with administrator or "root" access on a machine along with the capability of gathering sensitive data. The attacker using attacker computer system 114 can also snoop or eavesdrop on one or more systems 102, 104, and 106 or communications network 108, download and exfiltrate data, steal assets and information, destroy critical assets and information, and/or modify information. Rootkits have the ability to conceal themselves and elude detection, especially when the rootkit is previously unknown, as is the case with zero-day attacks.

It should also be noted that the owner of embedded device 110 or systems 102, 104, and/or 106 is generally not aware of what operations embedded device 110 is performing. That is, embedded device 110 can be acting under the control of another computer (e.g., attacking computer system 116) or autonomously based upon a previous computer attack which infected embedded device 110 with a virus, worm, trojan, spyware, malware, probe, etc.

More particularly, for example, each of the one or more collaborating or client computers 102, 104, and 106, embedded device 110, and attacking computer system 114, can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, collaborating system 102 can be implemented as a personal computer, a personal data assistant (PDA), a portable email device, a multimedia terminal, a mobile telephone, a set-top box, a television, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 1, communication links 112 can be any suitable mechanism for connecting collaborating systems 102, 104, 106, embedded device or devices 110, and attacking computer system 114 to communication network 108. Links 112 can be any suitable wired or wireless communication link, such as a T1 or T3 connection, a cable modem connection, a digital subscriber line connection, a Wi-Fi or 802.11(a), (b), (g), or (n) connection, a dial-up connection, and/or any other suitable communication link. Alternatively, communication links 112 can be omitted from system 100 when appropriate, in which case systems 102, 104, and/or 106 and embedded device 110 can be connected directly to communication network 108.

Figure 2:
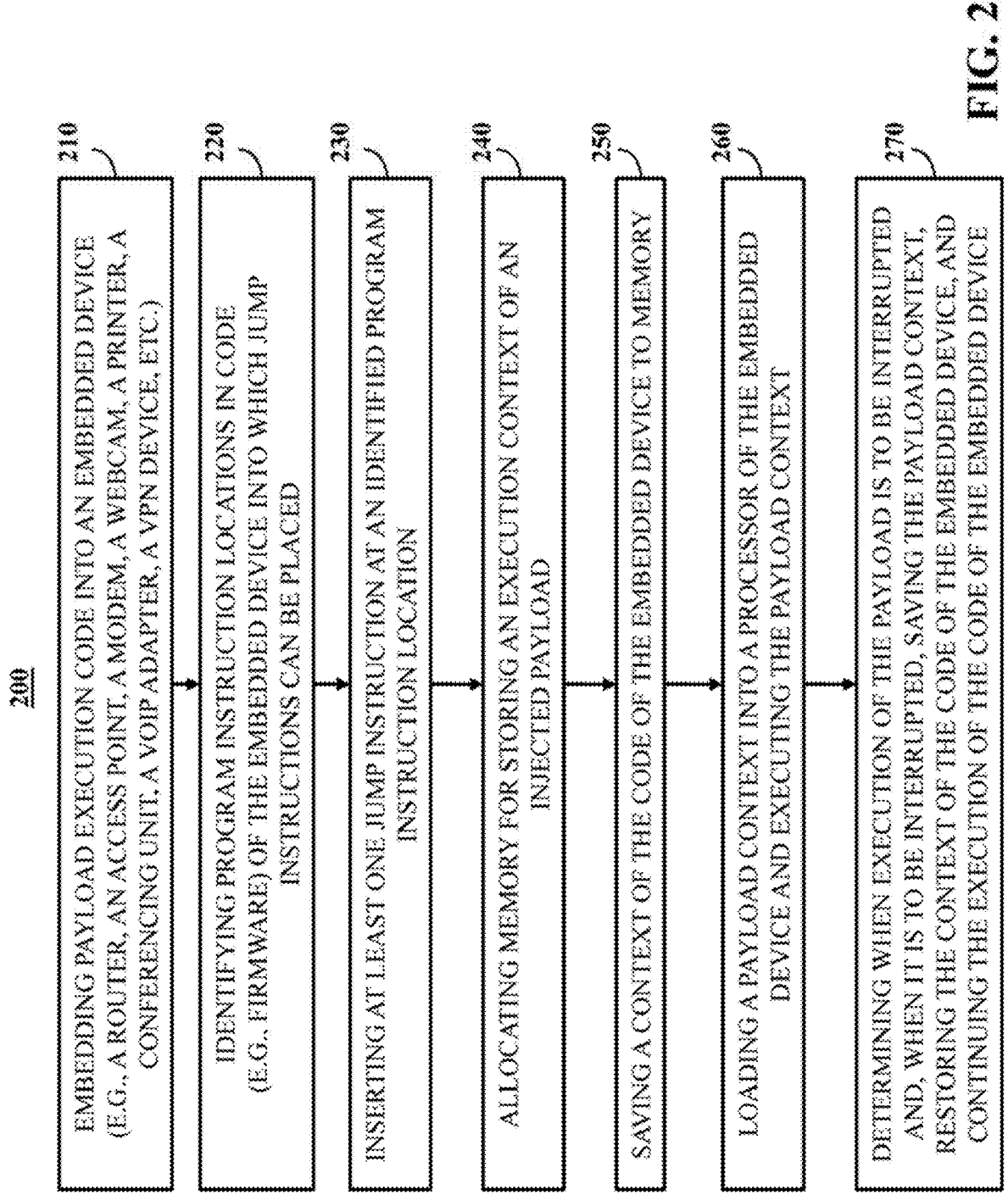
FIG. 2 is a diagram showing an illustrative example of a process for injecting code into embedded devices in accordance with some embodiments of the disclosed subject matter.

As described above, payload injection mechanisms that inject code into embedded devices, such as embedded device 110 of FIG. 1, can be provided. FIG. 2 illustrates an example of a process 200 for injecting payload code into an embedded device in accordance with some embodiments of the disclosed subject matter. As shown, process 200 begins by injecting or embedding payload execution code into an embedded device. As described above, an embedded device can be any number of routers, switches, gateways, webcams, gaming systems, input devices, imaging devices, conferencing units, communications devices, VPN devices, VOIP adapters, printers, and/or any other suitable devices. More particularly, the embedded device can be a MIPS-based embedded device or a PowerPC-based embedded device, such as a Cisco Systems router or a Linksys router.

In some embodiments, the payload execution code can be embedded in the embedded device at run time. For example, this can be done dynamically through the exercise of an exploitable vulnerability in the code base of the device. Alternatively, the payload execution code can modify the firmware of the embedded device prior to boot time. For example, this can be done by patching the Internetwork Operating System (IOS) software installed on a router.

Figure 3:
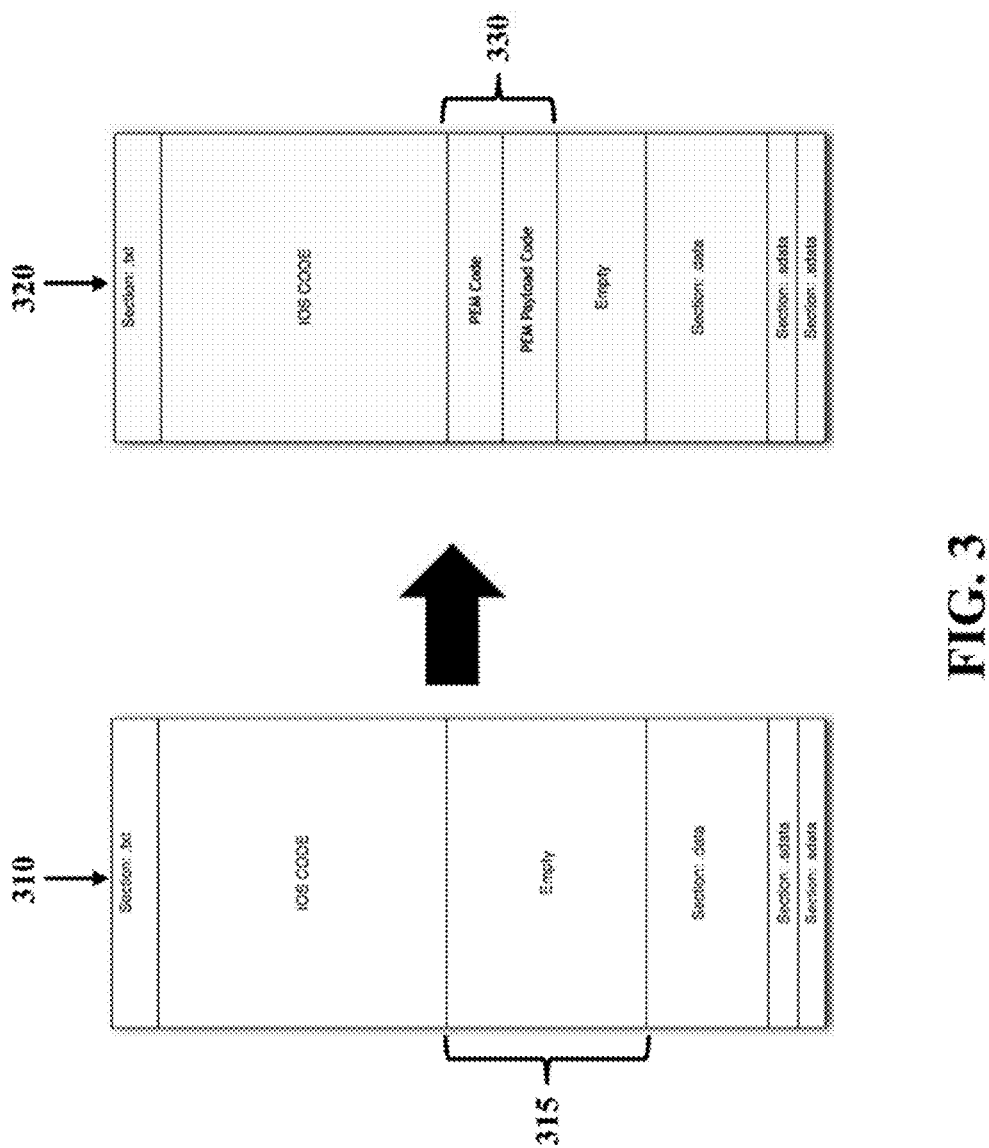
FIG. 3 is a diagram showing an illustrative example of a memory layout for allocating injected payload execution code into a small segment of unused memory in accordance with some embodiments of the disclosed subject matter.

As shown in FIG. 3, the payload execution code injected into the embedded device is allocated a small portion of unused memory on the embedded device (e.g., unused portion of memory 315 in FIG. 3). For example, in some embodiments, the payload execution code is stored in a portion of memory that is less than about four kilobytes. Within this small portion of unused memory, the payload execution code embeds both the payload execution environment and the target code within memory portion 330. The remaining portion of unused memory can be used for storing execution contexts of the injected payload as described herein.

It should be noted that these mechanisms modify the code of the embedded device without reliance upon the source code (e.g., without prior knowledge of function entry points, return instructions, program instruction locations, or other memory information in the embedded device). Referring back to FIG. 2, upon embedding the payload execution code into the embedded device, particular program instruction locations in the code are identified at 220. For example, the process can identify function entry points (FEPs), function or library routine return instruction locations, any other suitable program instruction or memory location, and/or any suitable combination thereof. More particularly, a static analysis on the embedded device's code is conducted to identify function entry points and/or any suitable program instruction locations suitable for hooking in. A subset of one or more program instruction locations is then selected. At 230, at least one jump instruction is inserted at an identified program instruction location.

Figure 4B:
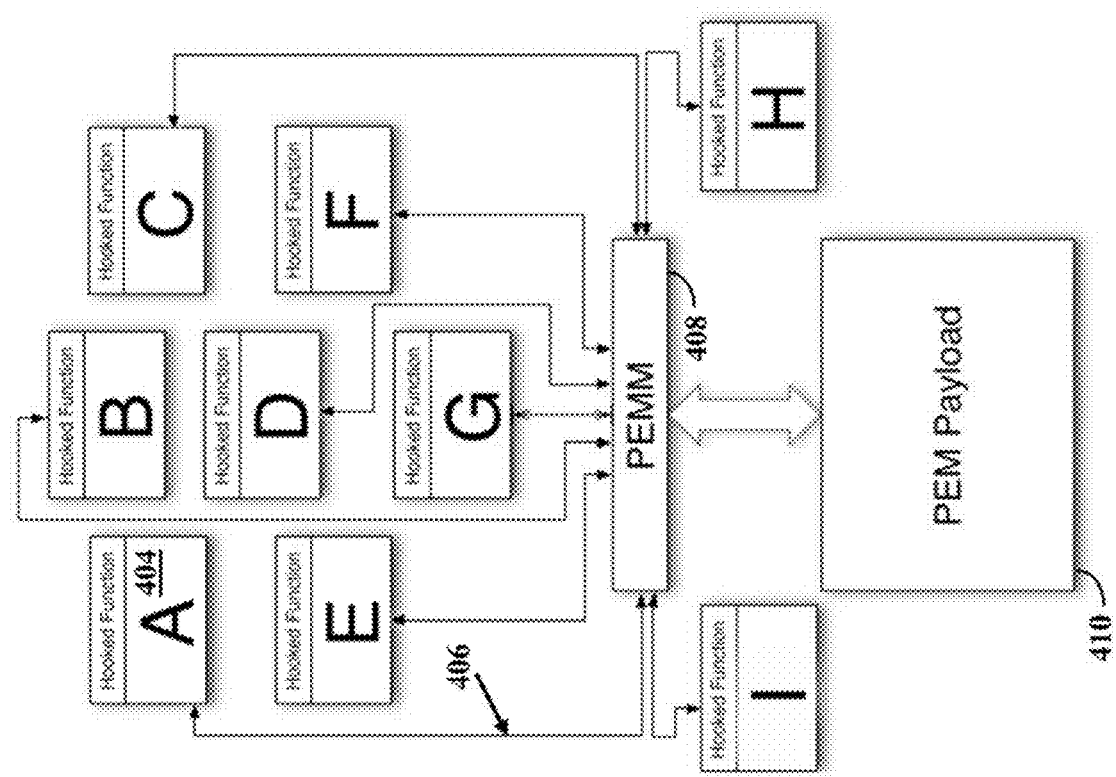
FIGS. 4A and 4B is a diagram showing an illustrative example of the interception of one or more arbitrary functions in the code of an embedded device in accordance with some embodiments of the disclosed subject matter.
Figure 4A:
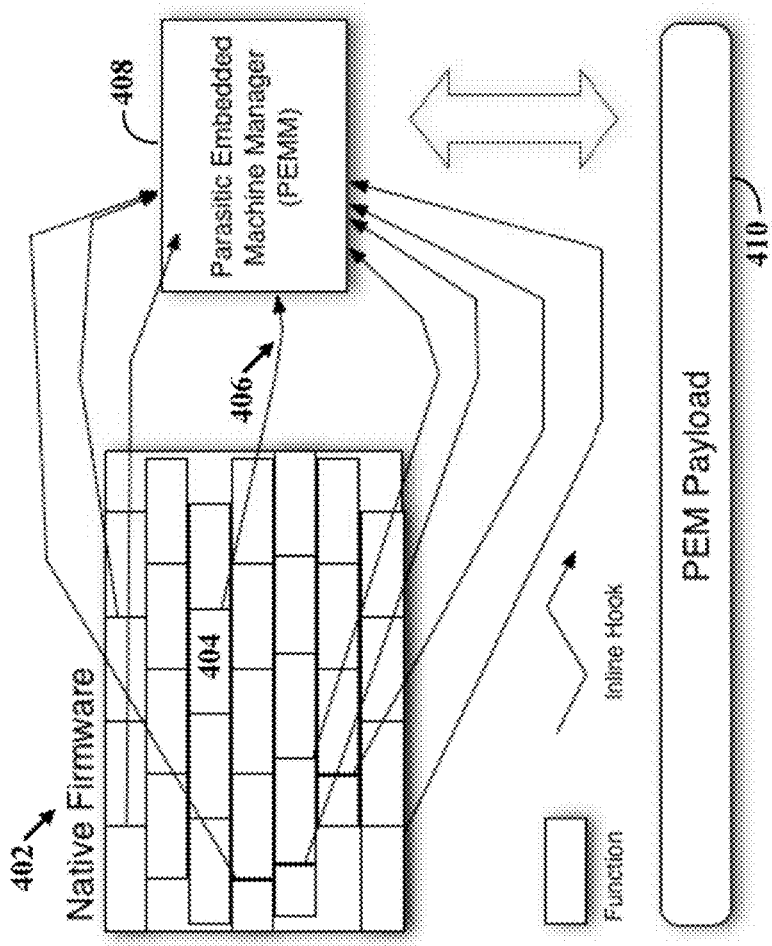

For example, as shown in FIGS. 4A and 4B, a particular function 404 (e.g., a native operating system function) of the native firmware or code 402 of the embedded device is intercepted by a Parasitic Embedded Machine Manager (PEMM) 408 using jump instruction or hook 406, which may be injected into the embedded device as part of the payload execution code. As shown in both FIGS. 4A and 4B, the payload injection mechanisms modify the code of the device to embed the payload execution code (e.g., PEM payload 410) and hook into a subset of identified functions (e.g., functions A through I). In some embodiments, after the PEMM and payload execution code are injected into the code of the embedded device, functions, such as native operating system functions, can be arbitrarily intercepted. In response, these injected hooks or jump instructions 406 invoke the payload execution code 410 prior to running the intended native function of the embedded device.

It should be noted that, in some embodiments, a single machine instruction is modified per program instruction (e.g., a function entry point, a function or library routine return instruction, etc.) and does not otherwise change the behavior of the code of the embedded device. That is, these mechanisms modify the code of the embedded device without affecting its original behavior.

Accordingly, the payload execution component is responsible for maintaining a stable execution environment for the injected payload and executing a number of instructions of the payload each time it is invoked. More particularly, the payload execution component is responsible for maintaining a persistent state of the injected payload execution across repeated invocations of the function entry points, function or library routine return instructions, or any other suitable program instruction, and regulates the payload's processor usage per invocation.

Referring back to FIG. 2, process 200 allocates a small portion of memory within the memory region to store an execution context of the injected payload at 240. As shown in FIG. 3, an unused portion of memory 315 can be allocated for the execution context. It should be noted that the execution context can be similar to any stack oriented process execution system. The execution context for the payload can include values, such as, for example, payload stack pointer, payload instruction pointer, payload register values, etc. In some embodiments, these mechanisms provide a specialized, low memory payload virtual machine that is time multiplexed with the code (e.g., firmware) of the embedded device and invoked each time the hooked function entry points or program instructions are executed by the native code.

Each time the payload execution code is invoked in response to the jump instruction inserted at 230, a context switch is performed. The context switch can include saving the context of the code of the embedded device into memory (at 250) and then loading and executing a payload execution context into the processor of the embedded device (at 260). More particularly, the payload instruction pointer value is used, where the execution of the payload execution code begins from where it last left off by jumping to the address indicated by the payload instruction pointer value.

It should be noted that the payload execution code is generally written such that it periodically returns to an execution context, but not frequently such that a substantial delay in the execution of the firmware of the embedded device. That is, the injected payload can operate without an appreciable decrease in the performance of the embedded device.

At 270, process 200 determines when the execution of the payload is to be interrupted. For example, the number of jumps that have occurred can be counted and the execution of the payload can be interrupted after a given number of jumps have occurred. When it is determined that the payload is to be interrupted, the stage of the payload context is saved and the previously saved context of the previously running code is restored, thereby continuing the execution of the code of the embedded device from the point at which it was suspended.

Figure 5:
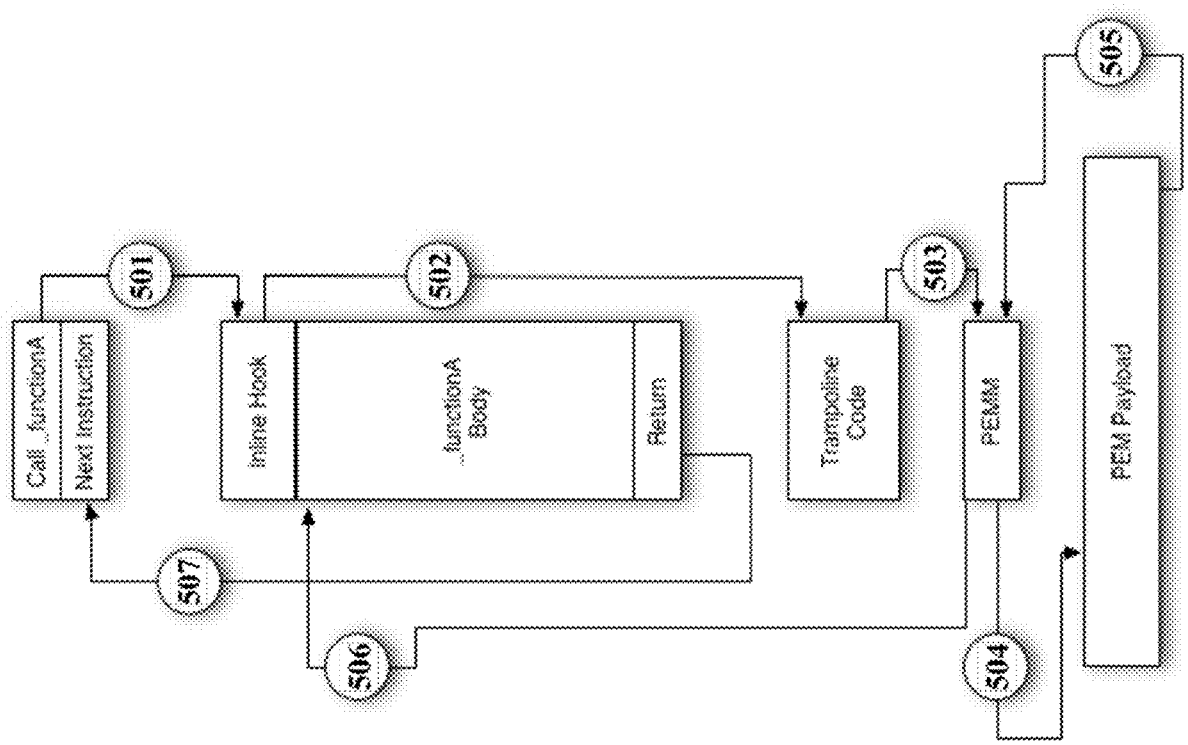
FIG. 5 is a flow diagram showing an illustrative example of the execution of a function modified by the injected code, where the payload execution code is loaded and executed prior to the execution of the native function in accordance with some embodiments of the disclosed subject matter.

Similarly to process 200 shown in FIG. 2, FIG. 5 shows an illustrative flow diagram of the execution environment that allows the payload execution code to execute repeatedly in a time-multiplexed fashion without affecting the embedded device's original behavior. As shown, in response to calling a function (_functionA) that has been modified with payload execution code at 501, the hook using at least one jump instruction invokes the payload execution code before running the intended native function (_functionA Body) at 502. The jump instruction then points to the Payload Execution Machine Manager (PEMM) at 503, where the PEMM was injected into the embedded device as part of the payload execution code. In some embodiments, the PEMM manages an isolated execution context of the payload (sometimes referred to herein as the "PEM Payload").

As described above in connection with FIG. 2, the PEMM manages the context switch at 504. The context of the code of the embedded device into memory is saved and a payload execution context is executed in the embedded device. For example, the PEMM can retrieve a payload instruction pointer value or any other suitable value to determine a particular point for executing the payload execution code. To provide minimal delay to the performance of the embedded device, the PEMM determines when the execution of the payload is to be interrupted at 505. In one example, the PEMM can determine the number of jumps that have occurred, the amount of time that has elapsed, or any other suitable criterion. In response to determining that the payload is to be interrupted, the PEMM performs another context switch at 506. For example, the PEMM can save the stage of the payload context and restore the previously saved context of the previously running code. At this point, the execution of the code of the embedded device is continued from the point at which it was suspended. Upon completion of that particular function (_functionA), the code points to the next function at 507.

It should be noted that the payload execution code executes in parallel to the code of the embedded device (e.g., firmware), the payload execution code is invisible to the code of the embedded device, and the payload execution code controls processor and memory allocations between the code of the embedded device and itself.

An example of the payload execution code in accordance with some embodiments is shown in FIG. 6. As shown, the payload execution code scans through a segment of memory and performs a computation on the memory segment before periodically yielding control of the processor back to the native code (e.g., native operating system). For example, the payload execution code can calculate a checksum over protected operating system memory regions (e.g., code sections, data sections, etc.).

In a more particular example, upon first installation of a payload execution code (e.g., an injected router monitor and integrity function), the memory of the embedded device is scanned and a hash of that memory is produced and stored in a white list maintained by the integrity checking software. In subsequently performed checks, the same memory is scanned and the hash is recalculated and compared to the initial hash first computed upon the first injection of code. Accordingly, the integrity checksum is periodically or continuously recomputed at prescribed or desired intervals and checked against the white list to detect any modification to the code. Any malicious code injections result in a different hash value, which is detected by the injected code.

In another example, as Cisco IOS images are known and widely deployed to many routers that form the backbone of the Internet, checksums for all IOS images can be pre-calculated in an offline fashion and supplied with the code injection mechanisms. Any change to the code section, which should not be modified by any legitimate code, can be an accurate indicator of exploitation of the router or other embedded device that is detected in real time.

Accordingly, methods, systems, and media are provided for injecting code into embedded devices.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for injecting information into embedded devices, the method comprising:
   identifying memory within a firmware memory region of an embedded device, wherein the embedded device includes code stored in the firmware memory region;
   embedding payload execution code into a first portion of the memory of the embedded device;
   identifying program instructions in the code stored in the firmware memory region of the embedded device into which jump instructions can be placed by performing a static analysis on the code stored in the firmware memory region of the embedded device to identify a plurality of function entry points, wherein the static analysis is performed prior to inserting at least one jump instruction into the code stored in the firmware memory region of the embedded device;
   inserting the at least one jump instruction at an identified function entry point from the plurality of function entry points in the code stored in the firmware memory region of the embedded device, wherein the at least one jump instruction is part of the payload execution code;
   allocating a second portion of the memory and storing an execution context of an injected payload into the second portion of the memory, wherein the injected payload is part of the payload execution code embedded in the first portion of the memory;
   saving a context of the code stored in the firmware memory region of the embedded device to the second portion of the memory in response to detecting an execution of the at least one jump instruction;
   loading the execution context of the injected payload into a processor of the embedded device;
   causing the injected payload to be executed by the processor based on the execution context of the injected payload;
   determining when execution of the injected payload is to be interrupted; and
   in response to determining that the execution of the injected payload is to be interrupted, saving the execution context of the injected payload, restoring the context of the code stored in the firmware memory region of the embedded device, and continuing execution of the code stored in the firmware memory region of the embedded device.

2. The method of claim 1, wherein the payload execution code is embedded into the embedded device at run time by exploiting a vulnerability in the embedded device.

3. The method of claim 1, wherein the payload execution code is embedded into the embedded device at boot time by patching the code stored in the firmware memory region of the embedded device.

4. The method of claim 1, wherein the execution context of the injected payload includes at least one of a payload stack pointer, a payload instruction pointer, and a payload register value.

5. The method of claim 4, further comprising using the payload instruction pointer to access the payload execution code at a particular address for execution.

6. The method of claim 1, wherein determining when the execution of the injected payload is to be interrupted further comprises determining at least one of: a number of jump instructions that have been executed and an amount of time that has elapsed prior to execution of the code stored in the firmware memory region of the embedded device.

7. The method of claim 1, wherein the execution of the injected payload performs a first checksum on portions of the firmware memory region of the embedded device.

8. The method of claim 7, wherein the execution of the injected payload verifies integrity of the code stored in the firmware memory region of the embedded device by performing a second checksum on the portions of the firmware memory region of the embedded device and comparing the second checksum with the first checksum.

9. A non-transitory computer-readable medium containing computer-executable instructions that, when executed by a processor, cause the processor to perform a method for injecting information into embedded devices, the method comprising:

identifying memory within a firmware memory region of an embedded device, wherein the embedded device includes code stored in the firmware memory region;

embedding payload execution code into a first portion of the memory of the embedded device;

identifying program instructions in the code stored in the firmware memory of the embedded device into which jump instructions can be placed by performing a static analysis on the code stored in the firmware memory region of the embedded device to identify a plurality of function entry points, wherein the static analysis is performed prior to inserting at least one jump instruction into the code stored in the firmware memory of the embedded device;

inserting the at least one jump instruction at an identified function entry point from the plurality of function entry points in the code stored in the firmware memory of the embedded device, wherein the at least one jump instruction is part of the payload execution code;

allocating a second portion of the memory and storing an execution context of an injected payload into the second portion of the memory, wherein the injected payload is part of the payload execution code embedded in the first portion of the memory;

saving a context of the code stored in the firmware memory of the embedded device to the second portion of the memory in response to detecting an execution of the at least one jump instruction;

loading the execution context of the injected payload into an embedded device processor of the embedded device;

causing the injected payload to be executed by the embedded device processor based on the execution context of the injected payload;

determining when execution of the injected payload is to be interrupted; and in response to determining that the execution of the injected payload is to be interrupted, saving the execution context of the injected payload, restoring the context of the code stored in the firmware memory of the embedded device, and continuing execution of the code stored in the firmware memory of the embedded device.

10. The non-transitory computer-readable medium of claim 9, wherein the payload execution code is embedded into the embedded device at run time by exploiting a vulnerability in the embedded device.

11. The non-transitory computer-readable medium of claim 9, wherein the payload execution code is embedded into the embedded device at boot time by patching the code stored in the firmware memory of the embedded device.

12. The non-transitory computer-readable medium of claim 9, wherein the execution context of the injected payload includes at least one of: a payload stack pointer, a payload instruction pointer, and a payload register value.

13. The non-transitory computer-readable medium of claim 12, further comprising using the payload instruction pointer to access the payload execution code at a particular address for execution.

14. The non-transitory computer-readable medium of claim 9, wherein determining when the execution of the injected payload is to be interrupted further comprises determining at least one of: a number of jump instructions that have been executed and an amount of time that has elapsed prior to execution of the code stored in the firmware memory of the embedded device.

15. The non-transitory computer-readable medium of claim 9, wherein the execution of the injected payload performs a first checksum on portions of the firmware memory region of the embedded device.

16. The non-transitory computer-readable medium of claim 15, wherein the execution of the injected payload verifies integrity of the code stored in the firmware memory region of the embedded device by performing a second checksum on the portions of the firmware memory region of the embedded device and comparing the second checksum with the first checksum.

17. A system for injecting information into embedded devices, the system comprising:

a first memory; and a hardware processor that is coupled to the first memory and that is configured to:

identify second memory within a firmware memory region of an embedded device, wherein the embedded device includes code stored in the firmware memory region;

embed payload execution code into a first portion of the second memory of the embedded device;

identify program instructions in the code stored in the firmware memory region of the embedded device into which jump instructions can be placed by performing a static analysis on the code stored in the firmware memory region of the embedded device to identify a plurality of function entry points, wherein the static analysis is performed prior to inserting at least one jump instruction into the code stored in the firmware memory region of the embedded device;

insert the at least one jump instruction at an identified function entry point from the plurality of function entry points in the code stored in the firmware memory region of the embedded device, wherein the at least one jump instruction is part of the payload execution code;

allocate a second portion of the second memory and store an execution context of an injected payload into the second portion of the second memory, wherein the injected payload is part of the payload execution code embedded in the first portion of the second memory;

save a context of the code stored in the firmware memory region of the embedded device to the second portion of the second memory in response to detecting an execution of the at least one jump instruction;

loading the execution context of the injected payload into a processor of the embedded device;

causing the injected payload to be executed by the processor based on the execution context of the injected payload;

determining when execution of the injected payload is to be interrupted; and in response to determining that the execution of the injected payload is to be interrupted, saving the execution context of the injected payload, restoring the context of the code stored in the firmware memory region of the embedded device, and continuing execution of the code stored in the firmware memory region of the embedded device.

\* \* \* \* \*